United States Patent [19]
Shimada

[11] Patent Number: 6,016,181
[45] Date of Patent: Jan. 18, 2000

[54] LIQUID CRYSTAL DEVICE HAVING COLUMN SPACERS WITH PORTION ON EACH OF THE SPACERS FOR REFLECTING OR ABSORBING VISIBLE LIGHT AND METHOD FOR FABRICATING THE SAME

[75] Inventor: Shinji Shimada, Kashihara, Japan

[73] Assignee: Sharp Kabushiki Kaisha, Osaka, Japan

[21] Appl. No.: 08/955,140

[22] Filed: Oct. 21, 1997

[30] Foreign Application Priority Data

Nov. 7, 1996 [JP] Japan .................................. 8-294271

[51] Int. Cl.[7] ........................ G02F 1/333; G02F 1/1337; G02F 1/1339
[52] U.S. Cl. ........................ 349/156; 349/157; 349/110; 349/123
[58] Field of Search .................... 349/155–157, 349/123, 110

[56] References Cited

U.S. PATENT DOCUMENTS

| | | | |
|---|---|---|---|
| 4,763,995 | 8/1988 | Katagari et al. | 350/341 |
| 5,130,831 | 7/1992 | Kohara et al. | 359/81 |
| 5,625,473 | 4/1997 | Konodo et al. | 349/86 |
| 5,739,882 | 4/1998 | Shimizu et al. | 349/123 |
| 5,969,523 | 12/1997 | Yano | 349/32 |

FOREIGN PATENT DOCUMENTS 6-67135  3/1994  Japan .

*Primary Examiner*—William L. Sikes
*Assistant Examiner*—Julie Ngo
*Attorney, Agent, or Firm*—Dike, Bronstein, Roberts & Cushman, LLP; David G. Conlin; Lisa Swiszcz Hazzard

[57] ABSTRACT

The liquid crystal device of this invention includes a liquid crystal layer between a pair of substrates, wherein column-shaped spacers are disposed for controlling a gap between the pair of substrates, and each of the column-shaped spacers has a portion for substantially controlling the gap between the pair of substrates and a portion for reflecting or absorbing visible light, and the portion for reflecting or absorbing visible light is located at an interface between the spacer and at least one of the pair of substrates.

16 Claims, 2 Drawing Sheets it difficult to keep the cell gap uniform and generates display defects due to aggregation of spacers. As for the method including transcripting patterned column spacers, it is difficult to form spacers precisely at predetermined positions due to insufficient alignment precision and shrinking of the substrates.

LIQUID CRYSTAL DEVICE HAVING COLUMN SPACERS WITH PORTION ON EACH OF THE SPACERS FOR REFLECTING OR ABSORBING VISIBLE LIGHT AND METHOD FOR FABRICATING THE SAME

BACKGROUND OF THE INVENTION

1. Field of the Invention

The present invention relates to a liquid crystal device used as a display device and the like and a method for fabricating the same. More particularly, the invention relates to a liquid crystal device with excellent display quality which is free from light scattering from spacers, and a method for fabricating the same.

2. Description of the Related Art

Spacers are conventionally used to keep uniform the gap between a pair of substrates (cell gap) of a liquid crystal device. Such spacers are typically beads or fibers with a fine grain diameter which are sprinkled on one of the substrates during the fabrication of the liquid crystal device. The method for fabricating a liquid crystal device including sprinkling beads as the spacers, for example, is so simple that beads or fibers have been used as spacers for most conventional liquid crystal devices.

FIG. 3 shows an example of such conventional liquid crystal devices. The liquid crystal device includes a substrate 19 having thin film transistors (TFTs) 20 and pixel electrodes 21 formed thereon (hereinafter, referred to as an active matrix substrate) and a substrate 18 having counter electrodes 22 formed thereon (hereinafter, referred to as a counter substrate) disposed to face each other. A liquid crystal layer 26 is interposed between the counter substrate 18 and the active matrix substrate 19. Liquid crystal alignment films 23 and 24 are formed on the surfaces of the active matrix substrate 19 and the counter substrate 18, respectively, facing the liquid crystal layer 26. Spacers 25 are provided to keep uniform the cell gap between the counter substrate 18 and the active matrix substrate 19.

A liquid crystal device using spacers other than beads and fibers is proposed in Japanese Laid-Open Patent Publication No. 6-67135, for example. The technique disclosed in this publication includes transcripting pre-patterned column spacers. More specifically, the technique includes: forming alignment films on surfaces of an active matrix substrate and a counter substrate; rubbing the alignment films; forming column spacers made of a black resin on predetermined positions of a substrate which is neither the active matrix substrate nor the counter substrate; transcripting the spacers to non-pixel portions of the counter substrate (e.g., portions to be located above gate and data lines); disposing the active matrix substrate and the counter substrate having the transcripted spacers thereon to face each other; and filling the gap between the substrates with a liquid crystal material to form the liquid crystal layer.

The above conventional techniques have the following problems. Although the method including sprinkling beads or fibers as spacers is simple, the density of sprinkled spacers tends to vary from place to place. This often makes In recent years, a very fine technique has been demanded for liquid crystal devices to achieve the size of each pixel as small as 100 μm×100 μm or less. As a result, light scattering from spacers with a diameter of about 5 μm or liquid crystal molecules adjacent to the spacers has become a problem to be overcome. The above conventional techniques fail to overcome this problem. A method including coloring spacers has been proposed to reduce the light scattering from spacers. This method, however, has problems such as a reduction in reliability and display characteristics of the liquid crystal device due to migration of impurities from the spacers to a liquid crystal layer, and therefore has not put into practical use as of today.

In view of the foregoing, a liquid crystal device with excellent display quality which is free from light scattering from spacers and a simple method for fabricating such a liquid crystal device are desired.

SUMMARY OF THE INVENTION

The liquid crystal device of this invention includes a liquid crystal layer between a pair of substrates, wherein column-shaped spacers are disposed for controlling a gap between the pair of substrates, and each of the column-shaped spacers has a portion for substantially controlling the gap between the pair of substrates and a portion for reflecting or absorbing visible light, and the portion for reflecting or absorbing visible light is located at an interface between the spacer and at least one of the pair of substrates.

In one embodiment of the invention, the liquid crystal device further includes liquid crystal alignment films on sides of the substrates facing the liquid crystal layer, and the portion for reflecting or absorbing visible light is located at an interface between the spacer and at least one of the liquid crystal alignment films.

In another embodiment of the invention, the portion for reflecting or absorbing visible light includes a material selected from a metal and a metal-containing compound.

In still another embodiment of the invention, the portion for reflecting or absorbing visible light includes a metal.

In still another embodiment of the invention, the metal is selected from aluminum, tantalum, molybdenum, titanium, and chromium.

In still another embodiment of the invention, the portion for reflecting or absorbing visible light includes a metal-containing compound.

In still another embodiment of the invention, the metal-containing compound is a light absorbing material.

In still another embodiment of the invention, the metal-containing compound is selected from titanium oxide and chromium oxide.

In still another embodiment of the invention, the portion for substantially controlling the gap between the pair of substrates is an insulator.

In still another embodiment of the invention, the insulator is a polymer compound.

In still another embodiment of the invention, the insulator is selected from cyclized isoprene rubbers, phenol resins, novolak resins, and acrylates.

According to another aspect of the invention, a method for fabricating a liquid crystal device including a liquid crystal between a pair of substrates is provided. The method includes the steps of: forming column-shaped spacers each having a portion for substantially controlling a gap between the pair of substrates and a portion for reflecting or absorbing visible light on a base film; and attaching the column-shaped spacers formed on the base film to one of the pair of substrates.

In one embodiment of the invention, the step of attaching the column-shaped spacers includes crimping.

In another embodiment of the invention, the crimping is performed under heating.

In still another embodiment of the invention, the step of attaching the column-shaped spacers is performed after alignment processing of the substrates.

In still another embodiment of the invention, the portion for substantially controlling the gap between the pair of substrates of each spacer is made of a dry film resist.

Thus, the invention described herein makes possible the advantages of (1) providing a liquid crystal device with excellent display quality which is free from light scattering from spacers, and (2) providing a simple method for fabricating such a liquid crystal device.

These and other advantages of the present invention will become apparent to those skilled in the art upon reading and understanding the following detailed description with reference to the accompanying figures.

DESCRIPTION OF THE PREFERRED EMBODIMENTS

The "liquid crystal device" as used herein includes: display devices which serve as displays for TV sets and computers; optical information processors such as optical computers and optical arithmetic processors using spatial light modulation elements which modulate spatially (two-dimensionally) expanded light input to obtain spatial (two-dimensional) light output, and the like; and others.

The "column" shape as used herein includes cylindrical shapes, prism (triangle pole, square pole, and polygonal pole) shapes, truncated cone shapes, and truncated pyramid shapes.

Hereinbelow, a preferred embodiment of the liquid crystal device according to the present invention will be described. In this embodiment, an active matrix liquid crystal display device including amorphous silicon TFTs is used to implement the present invention. It would be understood that the present invention can also be implemented by a simple matrix liquid crystal device and an active matrix liquid crystal device using high-temperature or low-temperature polysilicon and the like. The present invention is applicable to liquid crystal devices of not only a twisted nematic (TN) mode but also any other display modes (e.g., an inplane switching type, a polymer dispersed type, and a surface passivation ferroelectric liquid crystal type). The present invention is also applicable to not only display devices but also optical information processors and the like. Substrates used in the present invention may be made of not only glass, but also plastic, quartz, ceramics, silicon wafers, and the like depending on the use of the liquid crystal device.

Figure 1:
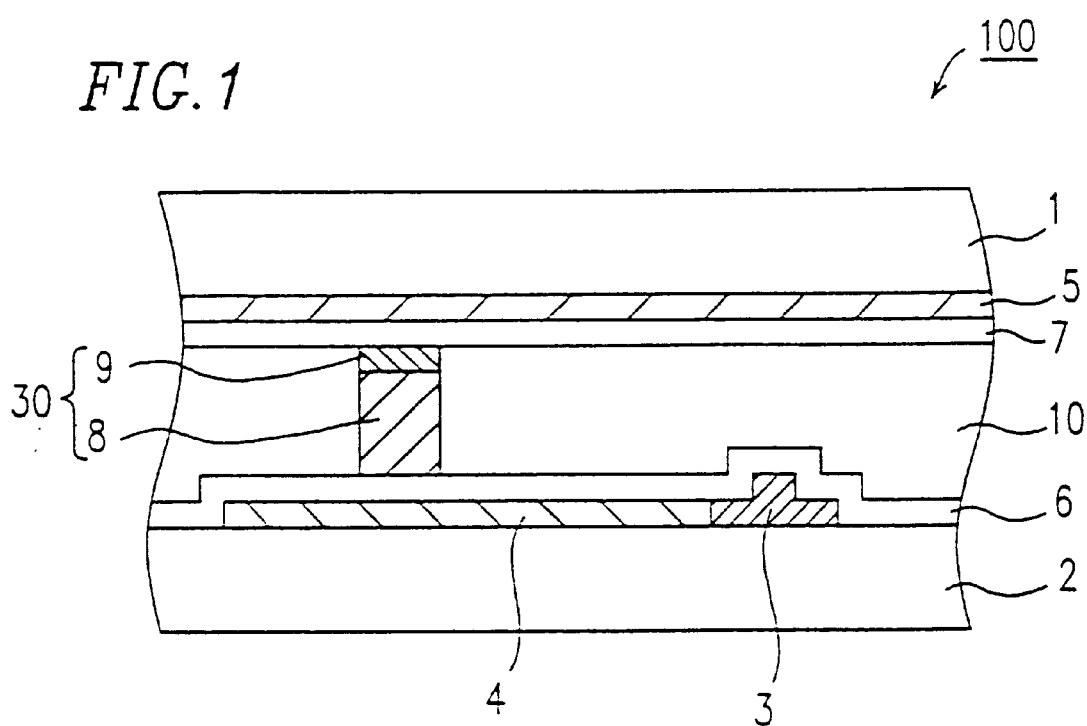
FIG. 1 is a schematic sectional view of a preferred embodiment of the liquid crystal device according to the present invention.
Figure 3:
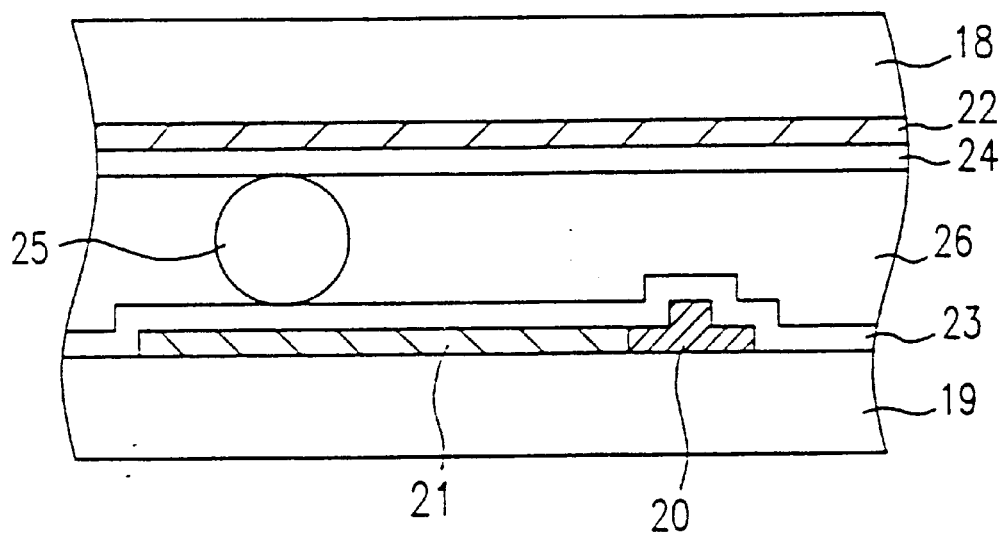
FIG. 3 is a schematic sectional view of a conventional liquid crystal device.

Hereinbelow, the active matrix liquid crystal display device according to the present invention will be described with reference to FIG. 1. FIG. 1 is a schematic sectional view of the liquid crystal display device.

A liquid crystal display device 100 includes an active matrix substrate 2 having TFTs 3 and pixel electrodes 4 formed thereon and a counter substrate 1 having counter electrodes 5 formed thereon facing each other. A liquid crystal layer 10 is interposed between the counter substrate 1 and the active matrix substrate 2. Liquid crystal alignment films 6 and 7 are formed on the surfaces of the active matrix substrate 2 and the counter substrate 1, respectively, facing the liquid crystal layer 10, as required. Column-shaped spacers 30 are provided between the counter substrate 1 and the active matrix substrate 2 to keep the cell gap uniform. Each of the column-shaped spacers 30 has a light-blocking portion 9 for reflecting or absorbing visible light and a gap control portion 8 for constituting the substantial height of the spacer 30 (i.e., substantially controlling the cell gap). The light-blocking portion 9 may be formed as a layer at the interface between the spacer and at least one of the substrates (or at the interface be seen the spacer and at least one of the liquid crystal alignment films when the alignment films are formed). Alternatively, the light-blocking portion 9 may also be formed over a portion of the outer circumference of the column-shaped spacer extending from the interface between the spacer and at least one of the substrates.

An exemplified method for fabricating the liquid crystal display device with the above configuration will be described.

First, a material such as tantalum, aluminum, molybdenum, titanium, copper, indium tin oxide, doped silicon, or a conductor containing any of these materials is deposited on a substrate by sputtering to a thickness of about 300 nm, for example, to form gate electrodes of a predetermined shape. Then, a gate insulating film made of an insulator such as silicon dioxide, silicon nitride, and tantalum oxide having a thickness of about 100 to about 300 nm, for example, is formed on the substrate having the gate electrodes formed thereon. The gate insulating film may be formed by anodic oxidation when the gate electrodes are made of tantalum, or otherwise may be formed by plasma chemical vapor deposition (CVD).

Thereafter, a semiconductor layer made of amorphous silicon having a thickness of about 50 nm, for example, is formed by plasma CVD, and subsequently an $n^+$-amorphous silicon layer having a thickness of about 10 to about 20 nm, for example, is formed by plasma CVD. These layers are patterned into a predetermined shape. Alternatively, the $n^+$-amorphous silicon layer may be formed by ion doping where phosphorus ions are selectively doped via a mask in the surface portion having a predetermined thickness of the semiconductor layer made of amorphous silicon.

A material such as tantalum, aluminum, molybdenum, titanium, copper, indium tin oxide, doped silicon, or a conductor containing any of these materials is deposited on the resultant substrate by sputtering to a thickness of about 300 to about 500 nm, for example, to form source/drain electrodes of a predetermined shape. Then, an insulator such as silicon dioxide, silicon nitride, and tantalum oxide is deposited on the resultant substrate by plasma CVD to a thickness of about 300 to about 500 nm, for example, to form an interlayer insulating film of a predetermined shape. In this way, the TFTs 3 are fabricated.

Indium tin oxide is then deposited on the substrate with the TFTs 3 formed thereon by sputtering to a thickness of about 50 to about 100 nm, for example, to form the pixel electrodes 4 of a predetermined shape. When a reflection tape liquid crystal display device is to be fabricated, the pixel electrodes 4 made of metal such as aluminum having a thickness of about 100 to about 300 nm, for example, may be formed by sputtering. In this way, the active matrix substrate 2 is fabricated.

A transparent electrode made of indium tin oxide or the like having a predetermined thickness is formed on a substrate by any appropriate method, to form the counter electrodes 5. In this way, the counter substrate 1 is fabricated. A black matrix and/or color filters may be formed on the counter substrate 1, as required.

Preferably, the liquid crystal alignment films 6 and 7 made of a heat-resistant resin such as polyimide having a predetermined thickness are formed on the active matrix substrate 2 and the counter substrate 1, respectively, by any appropriate method, and an alignment processing (e.g., a rubbing treatment) is conducted in a predetermined direction.

Then, spacers for controlling the gap between the substrates to keep it uniform are formed on the active matrix substrate. An exemplified method for forming the spacers will be described with reference to FIGS. 2A to 2E.

Figure 2A:
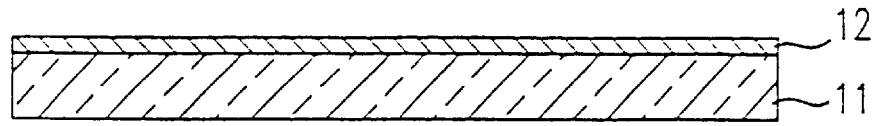
FIGS. 2A to 2E are schematic views illustrating a preferred example of a method for forming spacers used in the liquid crystal device according to the present invention.

As shown in FIG. 2A, a metal layer 12 having a thickness of about 50 to about 300 nm, for example, preferably about 100 nm is formed on a base film 11 made of a heat-resistant polymer material by vacuum evaporation. The metal layer 12, which is eventually to be the light-blocking portions 9 of the column-shaped spacers 30, is made of a metal or a compound containing a metal. Typically, the metal layer 12 (light-blocking portions 9) made of a metal reflects visible light, while that made of a metal-containing compound (preferably, a metal oxide) absorbs visible light. Examples of such a metal used for the metal layer 12 include aluminum, tantalum, molybdenum, titanium, and chromium. Aluminum is most preferable. In the case where the liquid crystal display device is directly viewed when practically used, the metal layer which absorbs visible light is preferable. In this case, the metal layer 12 may be made of a light absorbing material (e.g., a metal oxide such as titanium oxide and chromium oxide). The metal layer 12 may also be made by sputtering.

Figure 2B:
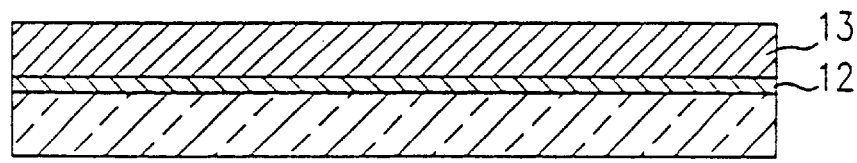

As shown in FIG. 2B, a dry film resist 13 which constitutes the substantial height of the spacers is uniformly attached to the metal layer 12 by any appropriate method. The dry film resist 13 is preferably made of an insulating material, more preferably made of an insulating polymer, so as to prevent power leak between the upper and lower substrates. The thickness of the dry resist film 13 is typically about 1 to about 12 μm, preferably about 2 to about 6 μm, though it may vary depending on the use of the liquid crystal device.

Figure 2C:
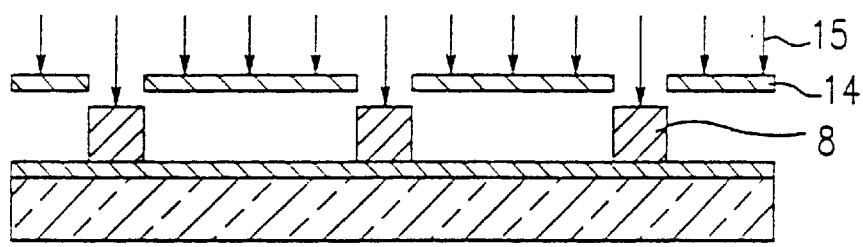

As shown in FIG. 2C, the dry film resist 13 is selectively irradiated with light 15 via a photomask 14 having a predetermined pattern, and then developed with a predetermined developing agent (e.g., tetramethyl ammonium hydride (TMAH)) to form the gap control portions 8 of the column-shaped spacers 30 at predetermined positions. FIG. 2C shows the case where the dry film resist 13 is a negative resist. Portions of the negative resist irradiated with the light 15 are cross-linked or polymerized to become insoluble, and left undissolved after the development. A positive resist may also be used as the dry film resist 13 according to the present invention. In the case of the positive resist, portions thereof irradiated with the light 15 are dissolved and removed at the development. In this case, therefore, the photomask 14 should have a pattern inverted from that used for the negative resist. Preferable materials for the dry film resist 13 include cyclized isoprene rubbers, phenol resins, novolak resins, and acrylates. Cyclized isoprene rubbers, phenol resins, and novolak resins are especially preferable.

Column-shaped spacers with any appropriate sectional shape may be formed by appropriately designing the pattern of the photomask. For example, the section of the spacers parallel to the surface of the substrate may be a circle, an ellipse, a shape outlined by a smooth curve, a shape outlined by a smooth curve and a straight line, a shape outlined by a plurality of straight lines (e.g., polygons such as a triangle, a square, a tetragon, and a rectangle). A circle and an ellipse are preferable. The number of the column-shaped spacers formed on the substrate can be strictly controlled by appropriately designing the pattern of the photomask. For example, the number of the column-shaped spacers may be one for each pixel, or may be appropriately determined depending on the size of the pixel electrode of each pixel.

Figure 2D:
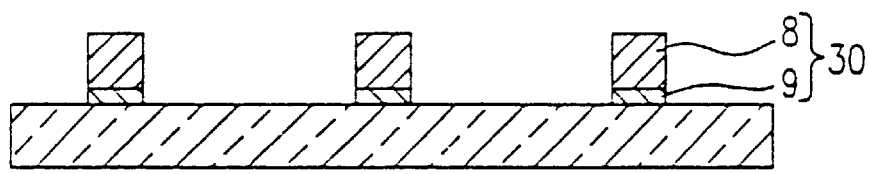

As shown in FIG. 2D, the exposed portions of the metal layer 12 are etched away with an acid (e.g., an Al etchant when aluminum is used for the metal layer) to form the light-blocking portions 9 of the column-shaped spacers 30. Thus, the column-shaped spacers 30 each having the light-blocking portion 9 and the gap control portion 8 are formed on the base film 11. The exposed aluminum of the metal layer 12 can be efficiently etched away since the gap control portions 8 and the base film 11 are acid-resistant materials. With the thus-formed light-blocking portions 9 of the column-shaped spacers, light incident on the spacers 30 is blocked (reflected or absorbed), thereby preventing the light scattering from the spacers. Therefore, the spacers can be disposed anywhere on the substrate, eliminating the necessity of strictly controlling the positions of the spacers. This significantly simplifies the fabrication process of the liquid crystal device, and is also advantageous for the miniaturization of pixels required for higher-precision liquid crystal devices.

Figure 2E:
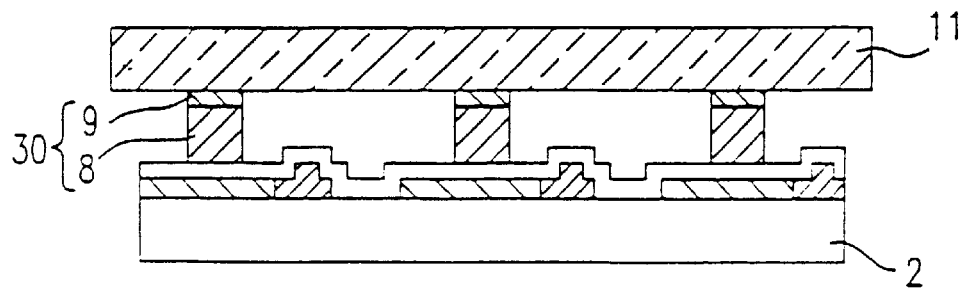

As shown in FIG. 2E, the base film 11 with the column-shaped spacers 30 formed thereon and the active matrix substrate 2 are disposed to face each other with the gap control portions 8 being in contact with the active matrix substrate 2, and then crimped together (i.e., the column-shaped spacers are adhered to the active matrix substrate). The crimping may be performed under any appropriate conditions (e.g., for about 60 minutes at about 1 kg/cm$^2$). The base film 11 is then removed by any appropriate method to leave only the column-shaped spacers 30 on the active matrix substrate 2. The crimping may be accompanied by heating (e.g., to a temperature of about 200° C.), or may be performed with a rotary roller. In the latter case, the base film 11 with the column-shaped spacers 30 is attached to a rotary roller, and a portion of the base film 11 attached to the rotary roller is brought into contact with the active matrix substrate 2. The rotary roller is then rotated at a predetermined speed, while the active matrix substrate 2 is shifted at the predetermined speed, to allow the column-shaped spacers 30 to be sequentially placed on the active matrix substrate 2. The rotary roller may be heated. Alternatively, the column-shaped spacers 30 may be adhered to the counter substrate 1.

The active matrix substrate 2 with the column-shaped spacers 30 formed thereon as described above and the counter substrate 1 with a seal resin pattern are attached together. A liquid crystal material is injected in a space between the substrates in a sealing manner to form the liquid crystal layer 10. Thus, a liquid crystal panel is obtained. Examples of the seal resin material include epoxy thermosetting resins and epoxy photocurable resins. Any appropriate liquid crystal material may be used depending on the use and the display mode of the liquid crystal device. For example, ZLI-4792 nematic liquid crystal material (Merck & Co., Inc.) or the like may be used for the liquid crystal display device of this embodiment which employs the TN display mode.

Two polarizing plates are disposed on the above liquid crystal panel, and the resultant device is provided with driver ICs and connected to driving circuits, so as to obtain a liquid crystal display device.

The liquid crystal display device with the above configuration was actually fabricated, and the display characteristics thereof were measured. It was found from the measurement results that the liquid crystal display device according to the present invention is free from light leak due to the spacers, has good display uniformity, and has a high contrast. In other words, a liquid crystal display device with excellent display quality was obtained.

The display contrast of the device according to the present invention and that of a conventional liquid crystal device with spacers just sprinkled were measured for comparison. As a result, the display contrast of the device according to the present invention was about 400, while that of the conventional device was 100. This indicates that the liquid crystal display device according to the present invention can provide a very high contrast.

An information processor (i.e., a liquid crystal device) using the liquid crystal panel according to the present invention was actually fabricated to examine the characteristics. As a result, effects such as reducing information misconception were observed.

Hereinbelow, the function of the present invention will be described.

The liquid crystal device according to the present invention includes: a liquid crystal layer disposed between a pair of substrates; and column-shaped spacers for controlling the gap between the pair of substrates. Each of the column-shaped spacers has a portion for substantially controlling the gap between the pair of substrates (gap control portion) and a portion for reflecting or absorbing visible light (light-blocking portion). The light-blocking portion is located at the interface between the column-shaped spacer and at least one of the pair of substrates. Since the spacers of the liquid crystal device according to the present invention are of a column shape, the top and bottom faces of the spacers are in contact with the substrates. That is, the contact areas of the spacers with the substrates are large compared with the case of conventional spherical spacers which are in contact with substrates at points. Therefore, the column-shaped spacers can control the cell gap stably and correctly, as well as reducing the stress concentration to the contact portions between the substrates and the spacers. Thus, according to the present invention, a liquid crystal device with excellent pressure resistance and shock resistance can be obtained.

According to the present invention, each spacer has the light-blocking portion at the interface between the spacer and at least one of the substrates. When visible light is incident on the spacer from the substrate, therefore, it is reflected or absorbed by the light-blocking portion, without allowing the light to pass through the spacer. The visible light is therefore neither scattered by the spacer nor passing through the spacer to the liquid crystal layer. As a result, glittering of display and reduction in the display contrast in the spacer portions can be minimized. A liquid crystal display device with excellent display quality is thus obtained.

According to the present invention, the blocking (reflection or absorption) of light incident on the spacers by the light-blocking portions eliminates the necessity of strictly adjusting the positions of the spacers. Thus, since the column-shaped spacers can be disposed anywhere on the substrate, the fabrication process of the liquid crystal device is significantly simplified. This is also advantageous for the miniaturization of pixels required for higher-precision liquid crystal devices.

In a preferred embodiment, the light-blocking portions include a metal or a metal-containing compound. Metal reflects visible light to prevent the spacers from transmitting the visible light and thus scattering the light. Metal can efficiently reflect visible light even if it is thin. Therefore, the thickness of the light-blocking portions of the column-shaped spacers can be made negligibly small compared with the thickness of the gap control portions thereof. Thus, for the adjustment of the thickness of the column-shaped spacers, only the thickness of the gap control portions may be adjusted. Accordingly, column-shaped spacers with a highly precise thickness can be provided. On the other hand, a metal-containing compound (e.g., a light absorbing material such as a metal oxide) absorbs visible light to prevent the spacers from transmitting the visible light and thus scattering the light. A metal-containing compound can efficiently absorb visible light even if it is thin. Accordingly, due to the reason described in the case of using a metal for the light-blocking portions, column-shaped spacers with a highly precise thickness can be provided. Moreover, since such a metal-containing compound does not reflect visible light, the irregular reflection due to the reflection of visible light from the spacers (light-blocking portions) to the substrate, as well as the lowering of the display contrast of a reflection type liquid crystal device, can be minimized. Using a metal-containing compound is therefore especially preferable.

In a preferred embodiment, the gap control portions of the spacers are made of an insulator, so that a voltage leak between the upper and lower substrates can be prevented. The insulator is preferably a polymer compound, which has a high elasticity. Using a polymer compound, therefore, a larger margin is allowed at the control of the gap between the substrates when the substrates are attached together by pressing. The high elasticity of the spacers also provides the following advantage. Since the surface of the substrate with TFTs, electrode wirings, and the like formed thereon is uneven, forming column-shaped spacers on such an uneven surface conventionally requires strict positional control so that the spacers can be formed on the positions of the substrate of an equal level of height. According to the present invention, however, the spacers with a high elasticity can be compressed by pressing at the attachment of the substrates together even if the spacers are formed at different levels of height on the substrate. Thus, a failure in the uniformity of the gap between the substrates due to the formation of the column-shaped spacers at different levels of height on the substrate can be easily corrected. As a result, a liquid crystal device with a uniform gap between substrates can be easily fabricated without strict control of the positions of the spacers.

The method for fabricating a liquid crystal device according to the present invention includes the steps of: forming column-shaped spacers each having a gap control portion and a light-blocking portion on a base film; and attaching the column-shaped spacers formed on the base film to one of substrates. In the method according to the present invention, the spacers and the portions for blocking light from the spacers are simultaneously formed, thereby simplifying the fabrication process of the liquid crystal device. Moreover, the respective spacers can be formed separately at predetermined positions, and the positions where the spacers are formed can be precisely controlled.

In a preferred embodiment, the gap control portions are formed of a dry film resist. By using a dry film resist, the resist material required to obtain a uniform thickness can be efficiently used, compared with the case of using a conventional application-type resist material, thereby reducing the material cost (and thus the production cost).

In a preferred embodiment, the spacers each having the light-blocking portion and the gap control portion are disposed on a substrate (an alignment film) after alignment processing. In other words, the spacers (the light-blocking portions) which have been already patterned are disposed on the substrate. Accordingly, a patterning process which may be required at the formation of a conventional light-shading film can be omitted, thereby simplifying the fabrication process of the liquid crystal device. Moreover, it is not necessary to dispose the column-shaped spacers so as to correspond to predetermined positions of the light-shading film. This further simplifies the fabrication process of the liquid crystal device. The liquid crystal device according to the present invention is further advantageous in the following point. If the column-shaped spacers are formed before the formation of an alignment film, the spacers are damaged by the alignment processing, or the spacers block the alignment processing to result in forming an alignment film having spotted non-alignment portions. This reduces the pressure resistance and shock resistance of the liquid crystal device and lowers the display quality due to failure in the alignment of liquid crystal. These problems relating to the alignment processing can be overcome by disposing the spacers after the formation of an alignment film.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal device comprising a liquid crystal layer between a pair of substrates, wherein column-shaped spacers are disposed for controlling a gap between the pair of substrates, and each of the column-shaped spacers has a portion for substantially controlling the gap between the pair of substrates and a portion for reflecting or absorbing visible light, and the portion for reflecting or absorbing visible light is located at an interface between the spacer and at least one of the pair of substrates.

2. A liquid crystal device according to claim 1, further comprising liquid crystal alignment films on sides of the substrates facing the liquid crystal layer, and the portion for reflecting or absorbing visible light is located at an interface between the spacer and at least one of the liquid crystal alignment films.

3. A liquid crystal device according to claim 1, wherein the portion for reflecting or absorbing visible light includes a material selected from a metal and a metal-containing compound.

4. A liquid crystal device according to claim 3, wherein the portion for reflecting or absorbing visible light includes a metal.

5. A liquid crystal device according to claim 4, wherein the metal is selected from aluminum, tantalum, molybdenum, titanium, and chromium.

6. A liquid crystal device according to claim 3, wherein the portion for reflecting or absorbing visible light includes a metal-containing compound.

7. A liquid crystal device according to claim 6, wherein the metal-containing compound is a light absorbing material.

8. A liquid crystal device according to claim 7, wherein the metal-containing compound is selected from titanium oxide and chromium oxide.

9. A liquid crystal device according to claim 1, wherein the portion for substantially controlling the gap between the pair of substrates is an insulator.

10. A liquid crystal device according to claim 9, wherein the insulator is a polymer compound.

11. A liquid crystal device according to claim 10, wherein the insulator is selected from cyclized isoprene rubbers, phenol resins, novolak resins, and acrylates.

12. A method for fabricating a liquid crystal device including liquid crystal between a pair of substrates, the method comprising the steps of:

forming column-shaped spacers each having a portion for substantially controlling a gap between the pair of substrates and a portion for reflecting or absorbing visible light on a base film; and attaching the column-shaped spacers formed on the base film to one of the pair of substrates.

13. A method according to claim 12, wherein the step of attaching the column-shaped spacers includes crimping.

14. A method according to claim 13, wherein the crimping is performed under heating.

15. A method according to claim 12, wherein the step of attaching the column-shaped spacers is performed after alignment processing of the substrates.

16. A method according to claim 12, wherein the portion for substantially controlling the gap between the pair of substrates of each spacer is made of a dry film resist.

* * * * *